United States Patent
Youn

(10) Patent No.: US 7,373,853 B2
(45) Date of Patent: May 20, 2008

(54) POWER DELIVERY SYSTEM OF HYBRID ELECTRIC VEHICLE

(75) Inventor: Joo Woong Youn, Seoul (KR)

(73) Assignee: Hyundai Motor Company, Seoul (KR)

( * ) Notice: Subject to any disclaimer, the term of this patent is extended or adjusted under 35 U.S.C. 154(b) by 157 days.

(21) Appl. No.: 11/305,696

(22) Filed: Dec. 15, 2005

(65) Prior Publication Data
US 2007/0113697 A1  May 24, 2007

(30) Foreign Application Priority Data
Nov. 24, 2005  (KR) ............ 10-2005-0112809

(51) Int. Cl.
*F16H 59/00* (2006.01)
(52) U.S. Cl. .................................... 74/335
(58) Field of Classification Search ............ 74/335, 74/336 R, 342, 344
See application file for complete search history.

(56) References Cited

U.S. PATENT DOCUMENTS

| | | | | |
|---|---|---|---|---|
| 1,903,914 A | * | 4/1933 | Parrett ............... | 74/665 F |
| 2,334,958 A | * | 11/1943 | Rohkar ............... | 74/342 |
| 2,537,060 A | * | 1/1951 | Keese ................ | 74/15.2 |
| 2,701,476 A | * | 2/1955 | Keese ................ | 74/342 |
| 2,791,912 A | * | 5/1957 | Bixby ................ | 74/344 |
| 3,603,177 A | * | 9/1971 | Burrows .............. | 74/745 |
| 4,155,267 A | * | 5/1979 | Notestine ............ | 74/342 |
| 4,208,925 A | * | 6/1980 | Miller et al. ........ | 477/63 |
| 4,560,369 A | | 12/1985 | Hattori | |
| 5,832,777 A | * | 11/1998 | Weilant .............. | 74/335 |

FOREIGN PATENT DOCUMENTS

| | | |
|---|---|---|
| EP | 0 184 675 B1 | 6/1986 |
| JP | 11-254982 | 9/1999 |
| JP | 2001-268715 | 9/2001 |
| JP | 2003-072404 | 3/2003 |
| JP | 2004-278367 | 10/2004 |

* cited by examiner

*Primary Examiner*—Dirk Wright
(74) *Attorney, Agent, or Firm*—Morgan Lewis & Bockius LLP

(57) ABSTRACT

A power delivery system of a hybrid vehicle realizes a speed reduction route and a speed increase route, and thereby enhances fuel economy.

14 Claims, 3 Drawing Sheets

POWER DELIVERY SYSTEM OF HYBRID ELECTRIC VEHICLE

CROSS-REFERENCE TO RELATED APPLICATION

This application claims priority to and the benefit of Korean Patent Application No. 10-2005-0112809 filed in the Korean Intellectual Property Office on Nov. 24, 2005, the entire contents of which are incorporated herein by reference.

BACKGROUND OF THE INVENTION (a) Field of the Invention

The present invention relates to a power delivery system of a hybrid electric vehicle. More particularly, the present invention relates to a power delivery system of a hybrid electric vehicle having two speed ranges in addition to speed ranges of a transmission.

(b) Description of the Related Art

Generally, a hybrid electric vehicle uses two power sources of an engine and a motor, different from an internal combustion engine vehicle.

In the prior art, a continuously variable transmission (CVT) may be used as a transmission of a hybrid electric vehicle.

In addition, power delivered by a chain from the CVT is delivered to a differential case by gears coupled to two shafts.

A speed reduction ratio of gears coupled to two shafts is determined by sizes of gears, and a problem of noise vibration harshness (NVH) may occur.

A speed reduction ratio of gears coupled to two shafts is determined by the outer diameters of the gears.

However, when a speed reduction ratio of gears coupled to two shafts is set as one, there is a problem in that neither a speed increase nor a speed reduction can be realized.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiments of the present invention provide a power delivery system of a hybrid electric vehicle having advantages of realizing a speed reduction route and a speed increase route at the same time.

An exemplary a power delivery system for delivering output of a continuously variable transmission (CVT) of a hybrid electric vehicle to a driven shaft according to an embodiment of the present invention includes: a first gear and a second gear coupled to an output shaft of the CVT so as to rotate together with the output shaft; a third gear selectively engaged with the first gear so as to selectively receive power from the first gear and deliver the power received from the first gear to the driven shaft; a fourth gear integrally formed with the third gear so as to rotate together with the third gear and be selectively engaged with the second gear so as to selectively receive power from the second gear and deliver the power received from the second gear to the driven shaft; and an actuating device for moving the third gear and the fourth gear such that the third gear is engaged with the first gear or the fourth gear is engaged with the second gear.

In another embodiment, a power delivery system for delivering output of a continuously variable transmission (CVT) of a hybrid electric vehicle to a driven shaft includes: a first gear and a second gear coupled to an output shaft of the CVT so as to rotate together with the output shaft; a third gear selectively engaged with the first gear so as to selectively receive power from the first gear and deliver the power received from the first gear to the driven shaft; a fourth gear integrally formed with the third gear so as to rotate together with the third gear and be selectively engaged with the second gear so as to selectively receive power from the second gear and deliver the power received from the second gear to the driven shaft; an actuating device for moving the third gear and the fourth gear such that the third gear is engaged with the first gear or the fourth gear is engaged with the second gear; and a control unit for controlling operation of the actuating device. The control unit is programmed to determine whether a vehicle speed is greater than a predetermined vehicle speed; to control the actuating device such that the third gear spins without being engaged with the first gear and the fourth gear is engaged with the second gear, if the vehicle speed is greater than the predetermined vehicle speed; and to control the actuating device such that the fourth gear spins without being engaged with the second gear and the third gear is engaged with the first gear.

The actuating device may include a rack connected to the third gear and the fourth gear, a pinion connected to the rack, and a motor for rotating the pinion such that the third gear is engaged with the first gear or the fourth gear is engaged with the second gear.

In the case that the third gear is engaged with the first gear, the fourth gear may spin without being engaged with the second gear.

In the case that the fourth gear is engaged with the second gear, the third gear may spin without being engaged with the first gear.

A diameter of the first gear may be smaller than or equal to a diameter of the third gear, and a diameter of the second gear may be greater than or equal to a diameter of the fourth gear.

A diameter of the second gear may be greater than or equal to a diameter of the third gear, and a diameter of the fourth gear is smaller than or equal to a diameter of the first gear.

A stopper for limiting movements of the third gear and the fourth gear may be disposed on the driven shaft.

DETAILED DESCRIPTION OF THE EMBODIMENTS

Figure 1:
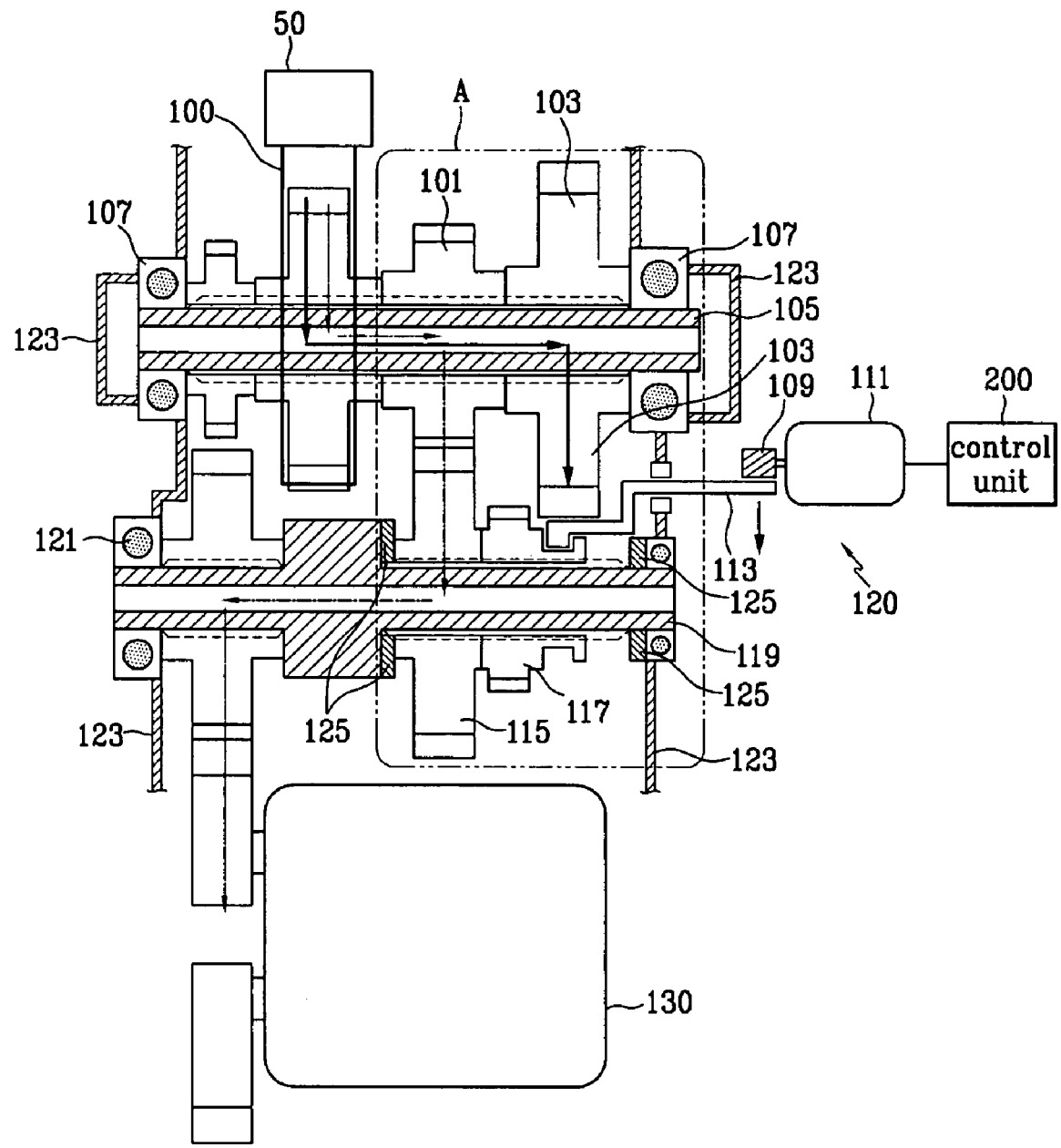
FIG. 1 is a drawing showing a power delivery system of a hybrid electric vehicle according to an exemplary embodiment of the present invention.

An exemplary embodiment of the present invention will hereinafter be described in detail with reference to the accompanying drawings.

DESCRIPTION OF REFERENCE NUMERALS INDICATING PRIMARY ELEMENTS IN THE DRAWINGS

100: chain
101: the first gear
103: the second gear
107: output shaft bearing
121: driven shaft bearing
120: actuating device
115: the third gear
117: the fourth gear
113: rack
111: motor
109: pinion As shown in FIG. 1, a power delivery system of a hybrid electric vehicle according to an exemplary embodiment of the present invention includes a first gear 101, a second gear 103, a third gear 115, a fourth gear 117, an actuating device 120, and a control unit 200.

The first gear 101 and the second gear 103 are coupled to an output shaft 105 of a continuously variable transmission (CVT) 50 so that they rotate together with the output shaft 105.

The third gear 115 is selectively engaged with the first gear 101, thereby selectively receiving power from the first gear 101 and delivering the received power to a driven shaft 119.

The fourth gear 117 is integrally formed with the third gear 115 so as to rotate together with the third gear 115, and it is selectively engaged with the second gear 103 to thereby selectively receive power from the second gear 103 and deliver the received power to the driven shaft 119.

The actuating device 120 moves the third gear 115 and the fourth gear 117 such that the third gear 115 is engaged with the first gear 101 or the fourth gear 117 is engaged with the second gear 103.

A hybrid electric vehicle includes the CVT 50, and power is delivered to the output shaft 105 from the CVT 50 via a chain 100.

Power delivered to the output shaft 105 rotates the first gear 101 and the second gear 103.

The first gear 101 and the second gear 103 may be fixedly coupled to or may be splined with the output shaft 105, thereby rotating together with the output shaft 105.

The third gear 115 and the fourth gear 117 are integrally formed with each other and are splined with a driven shaft 119 so that the third gear 115 and the fourth gear 117 rotate together with each other and are movable in an axis direction of the driven shaft 119.

The first gear 101 is selectively engaged with the third gear 115, and if the first gear 101 is not engaged with the third gear 115, the second gear 103 is engaged with the fourth gear 117.

That is, power delivered to the first gear 101 or the second gear 103 is delivered to the third gear 115 or the fourth gear 117 thereby rotating the driven shaft 119.

The control unit 200 may be realized as at least one microprocessor operated by a predetermined program, and the predetermined program can be programmed to include a set of instructions to perform steps for controlling the actuating device of the power delivery system according to an exemplary embodiment of the present invention, which will be described later in more detail.

The actuating device 120 includes a rack 113, a pinion 109, and a motor 111.

The rack 113 is connected to the third gear 115 and the fourth gear 117, and the pinion 109 is connected to the rack 113.

The motor 111 rotates the pinion 109 such that the third gear 115 is engaged with the first gear 101 or the fourth gear 117 is engaged with the second gear 103.

Figure 2:
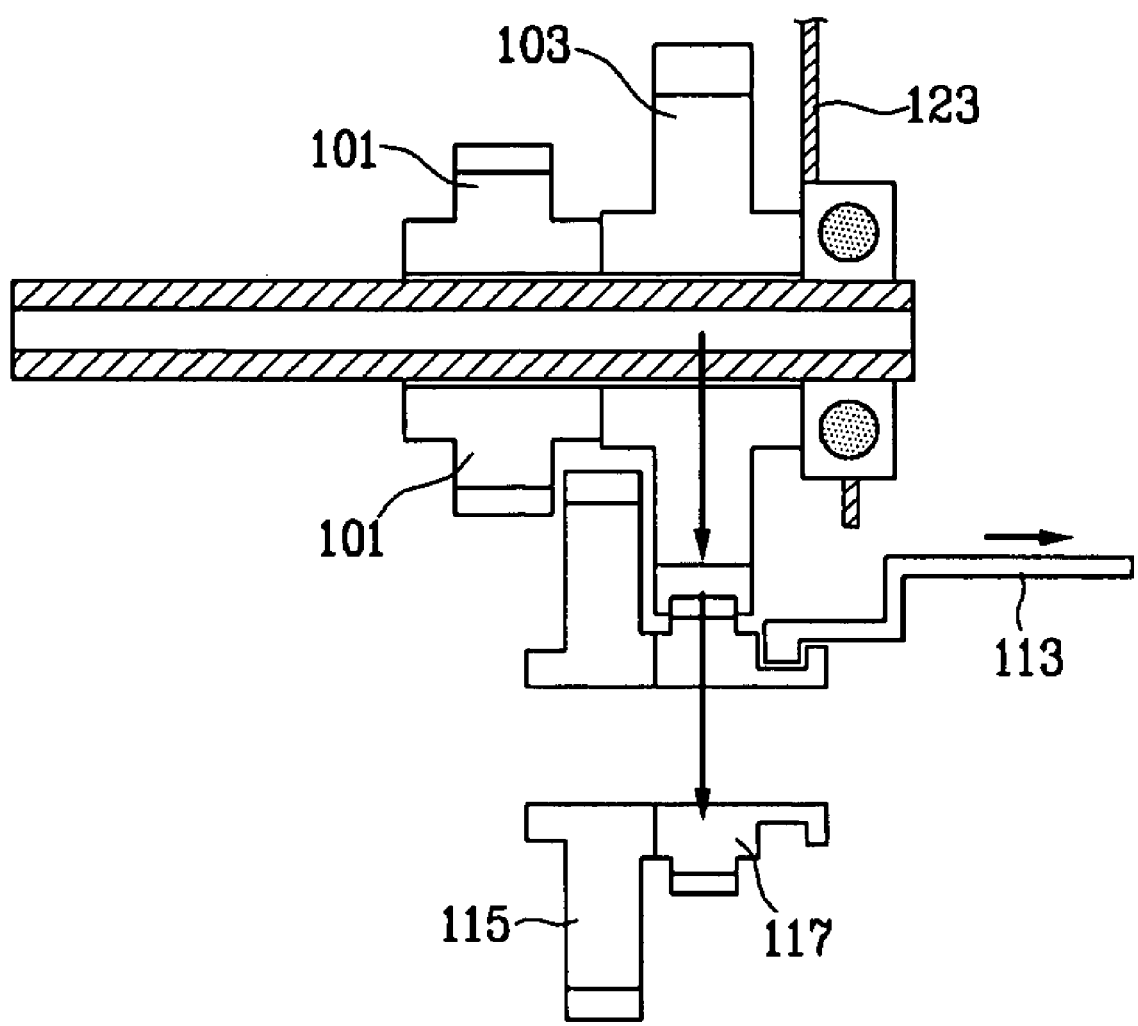
FIG. 2 is an enlarged view of a portion A in FIG. 1.

If the rack 113 moves in a leftward direction in FIG. 2 by the rotation of the pinion 109, the third gear 115 and the fourth gear 117 move in the leftward direction.

In addition, if the pinion 109 rotates in an opposite direction, the rack 113 moves in a rightward direction in FIG. 2, and thereby the third gear 115 and the fourth gear 117 move in the rightward direction in FIG. 2.

If the third gear 115 and the fourth gear 117 moves in a leftward direction, the third gear 115 is engaged with the first gear 101 and the fourth gear 117 is not engaged with the second gear 103. On the other hand, if the third gear 115 and the fourth gear 117 move in a rightward direction, the fourth gear 117 is engaged with the second gear 103 and the third gear 115 is not engaged with the first gear 101.

An output shaft bearing 107 is disposed on the output shaft 105, and a driven shaft bearing 121 is disposed on the driven shaft 119.

Therefore, the first gear 101 and the second gear 103 can easily rotate, and the third gear 115 and the fourth gear 117 can also easily rotate.

If the third gear 115 is engaged with the first gear 101, the fourth gear 117 spins without being engaged with the second gear 103. On the other hand, if the fourth gear 117 is engaged with the second gear 103, the third gear 115 spins without being engaged with the first gear 101.

While the third gear 115 and the fourth gear 117 spin in an engaged state, they scatter oil within a transmission case 123.

A diameter of the first gear 101 is smaller than or equal to a diameter of the third gear 115, and a diameter of the second gear 103 is greater than or equal to a diameter of the fourth gear 117.

That is, a power delivery route from the first gear 101 to the third gear 115 is a speed reduction route, and power output from the CVT is delivered to the differential case 130 via the speed reduction route along the dotted line arrow in FIG. 1.

In addition, a power delivery route from the second gear 103 to the fourth gear 117 is a speed increase route, and power output from the CVT is delivered to the differential case 130 via the speed increase route along the solid line arrow in FIG. 1 and FIG. 2.

When a vehicle climbs up a slope or carries a heavy load, the speed reduction route can be used. When a vehicle runs at a high speed, the speed increase route can be used.

In more detail, a diameter of the second gear 103 is greater than or equal to a diameter of the third gear 115, and a diameter of the fourth gear 117 is smaller than or equal to a diameter of the first gear 101.

Referring to the drawing, a stopper 125 for limiting movements of the third gear 115 and the fourth gear 117 is coupled to the driven shaft 119.

That is, the third gear 115 and the fourth gear 117 are moved by the actuating device 120, and movements thereof along an axial direction of the driven shaft 119 can be stopped by the stopper 125.

As an example, the stopper 125 may be made of a rubber material.

Hereinafter, a control method performed by the control unit 200 of the power delivery system of a hybrid electric vehicle according to an exemplary embodiment of the present invention will be explained.

Figure 3:
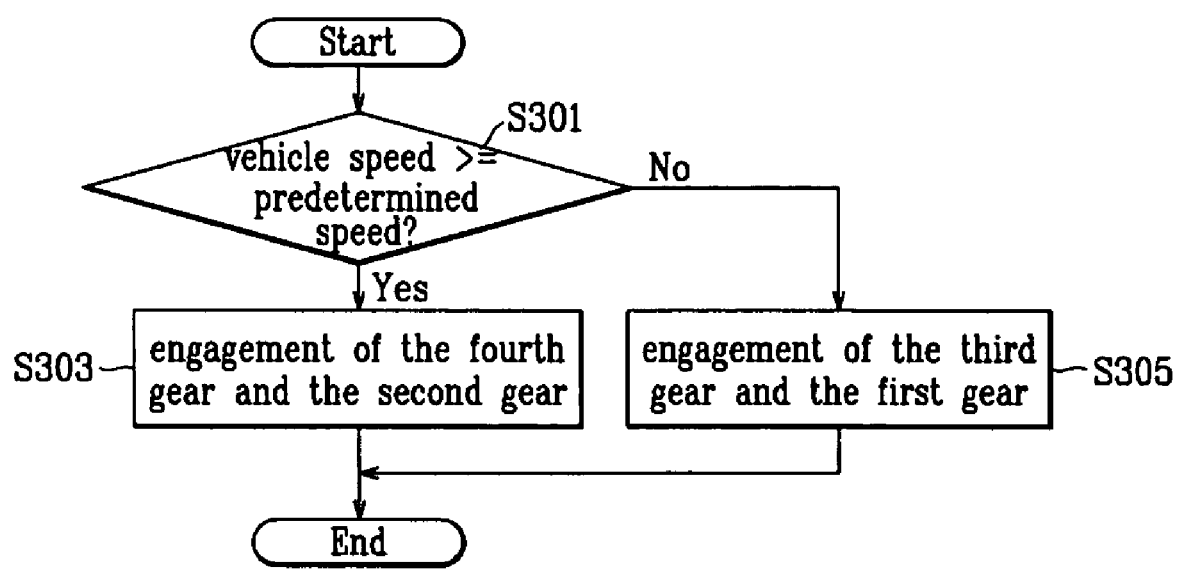
FIG. 3 is a flowchart of operations of a control unit of a hybrid electric according to an exemplary embodiment of the present invention.

FIG. 3 is a flowchart of operations of a control unit of a hybrid electric vehicle according to an exemplary embodiment of the present invention.

The control unit 200 determines whether a vehicle speed is greater than or equal to a predetermined vehicle speed at step S301.

That is, the control unit 200 determines whether a vehicle speed is a high speed or a low speed. The speed increase route can be used at a high speed, and a speed reduction route can be used at a low speed.

In an exemplary embodiment of the present invention, the predetermined vehicle speed can be set at 100 km/h.

Subsequently, if the vehicle speed is greater than or equal to the predetermined vehicle speed, the control unit 200 controls the actuating device 120 such that the third gear 115 spins without being engaged with the first gear 101 and the fourth gear 117 is engaged with the second gear 103, at step S303.

On the other hand, if the vehicle speed is not greater than or equal to the predetermined vehicle speed, the control unit 200 controls the actuating device 120 such that the fourth gear 117 spins without being engaged with the second gear 103 and the third gear 115 is engaged with the first gear 101, at step S305.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to an exemplary embodiment of the present invention, a speed reduction route and a speed increase route can be realized without substantial changes in a capacity and a structure of a transmission of a hybrid electric vehicle.

By realizing the speed reduction route and the speed increase route, fuel economy can be enhanced.

What is claimed is:

1. A power delivery system for delivering output of a continuously variable transmission (CVT) of a hybrid electric vehicle to a driven shaft, comprising:
   a first gear and a second gear coupled to an output shaft of the CVT so as to rotate together with the output shaft;
   a third gear selectively engaged with the first gear so as to selectively receive power from the first gear and deliver the power received from the first gear to the driven shaft;
   a fourth gear integrally formed with the third gear so as to rotate together with the third gear and be selectively engaged with the second gear so as to selectively receive power from the second gear and deliver the power received from the second gear to the driven shaft;
   an actuating device for moving the third gear and the fourth gear such that the third gear is engaged with the first gear or the fourth gear is engaged with the second gear; and
   a stopper for limiting movements of the third gear and the fourth gear, disposed on the driven shaft.

2. The power delivery system of claim 1, wherein the actuating device comprises:
   a rack connected to the third gear and the fourth gear;
   a pinion connected to the rack; and
   a motor rotating the pinion such that the third gear is engaged with the first gear or the fourth gear is engaged with the second gear.

3. The power delivery system of claim 1, wherein in the case that the third gear is engaged with the first gear, the fourth gear spins without being engaged with the second gear.

4. The power delivery system of claim 1, wherein in the case that the fourth gear is engaged with the second gear, the third gear spins without being engaged with the first gear.

5. The power delivery system of claim 1, wherein: a diameter of the first gear is smaller than or equal to a diameter of the third gear; and a diameter of the second gear is greater than or equal to a diameter of the fourth gear.

6. The power delivery system of claim 5, wherein: a diameter of the second gear is greater than or equal to a diameter of the third gear; and a diameter of the fourth gear is smaller than or equal to a diameter of the first gear.

7. A power delivery system for delivering output of a continuously variable transmission (CVT) of a hybrid electric vehicle to a driven shaft, comprising:
   a first gear and a second gear coupled to an output shaft of the CVT so as to rotate together with the output shaft;
   a third gear selectively engaged with the first gear so as to selectively receive power from the first gear and deliver the power received from the first gear to the driven shaft;
   a fourth gear integrally formed with the third gear so as to rotate together with the third gear and be selectively engaged with the second gear so as to selectively receive power from the second gear and deliver the power received from the second gear to the driven shaft;
   an actuating device for moving the third gear and the fourth gear such that the third gear is engaged with the first gear or the fourth gear is engaged with the second gear;
   a stopper for limiting movements of the third gear and the fourth gear, disposed on the driven shaft; and
   a control unit for controlling an operation of the actuating device,
   wherein the control unit is programmed to perform
   determining whether a vehicle speed is greater than a predetermined vehicle speed,
   controlling the actuating device such that the third gear spins without being engaged with the first gear and the fourth gear is engaged with the second gear, if the vehicle speed is greater than the predetermined vehicle speed, and
   controlling the actuating device such that the fourth gear spins without being engaged with the second gear and the third gear is engaged with the first gear.

8. The power delivery system of claim 7, wherein the actuating device comprises:
   a rack connected to the third gear and the fourth gear;
   a pinion connected to the rack; and
   a motor rotating the pinion such that the third gear is engaged with the first gear or the fourth gear is engaged with the second gear.

9. The power delivery system of claim 7, wherein in the case that the third gear is engaged with the first gear, the fourth gear spins without being engaged with the second gear.

10. The power delivery system of claim 7, wherein in the case that the fourth gear is engaged with the second gear, the third gear spins without being engaged with the first gear.

11. The power delivery system of claim 7, wherein: a diameter of the first gear is smaller than or equal to a diameter of the third gear; and a diameter of the second gear is greater than or equal to a diameter of the fourth gear.

12. The power delivery system of claim 11, wherein: a diameter of the second gear is greater than or equal to a diameter of the third gear; and a diameter of the fourth gear is smaller than or equal to a diameter of the first gear.

13. The power delivery system of claim 1, wherein the stopper comprises rubber.

14. The power delivery system of claim 7, wherein the stopper comprises rubber.

* * * * *